W. S. THOMSON.
SCREW DRIVER HAVING ADJUSTABLE HANDLE.
APPLICATION FILED OCT. 10, 1910.
1,000,051.
Patented Aug. 8, 1911.
2 SHEETS—SHEET 1.
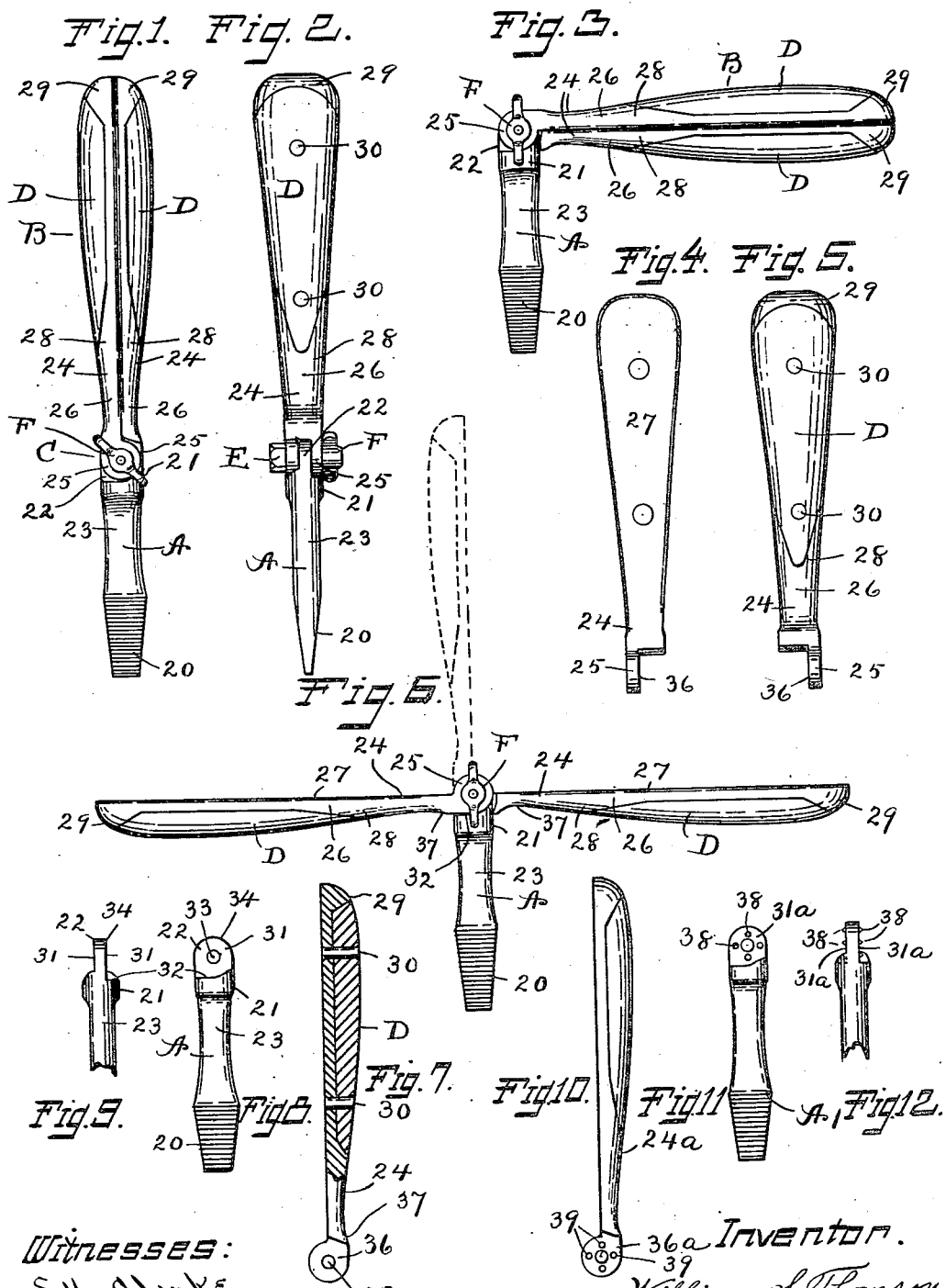

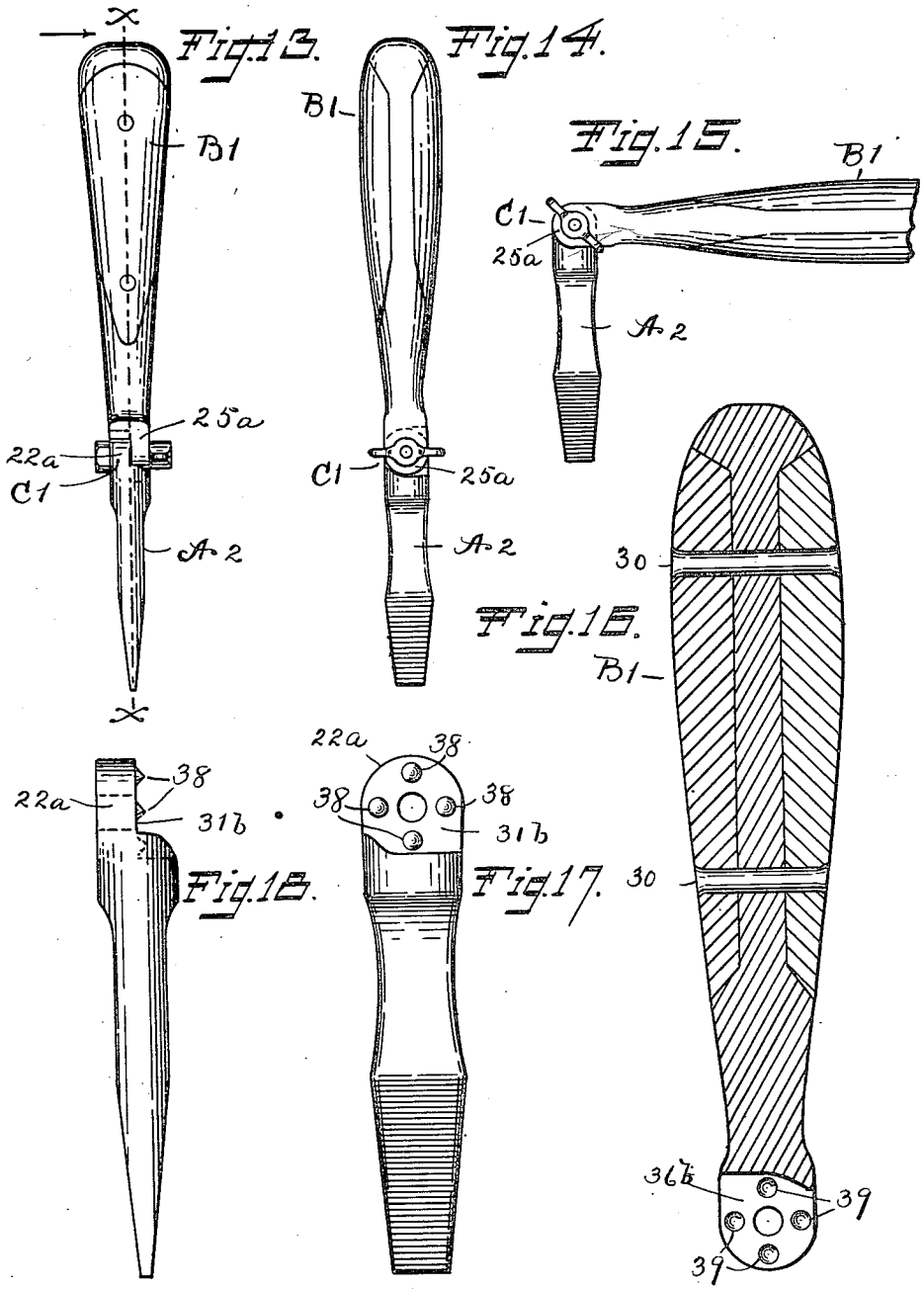

UNITED STATES PATENT OFFICE.

WILLIAM S. THOMSON, OF PLANTSVILLE, CONNECTICUT, ASSIGNOR TO THE H. D. SMITH AND COMPANY, OF PLANTSVILLE, CONNECTICUT, A CORPORATION.

SCREW-DRIVER HAVING ADJUSTABLE HANDLE.

1,000,051.  Specification of Letters Patent.  Patented Aug. 8, 1911.

Application filed October 10, 1910. Serial No. 586,172.

*To all whom it may concern:*

Be it known that I, WILLIAM S. THOMSON, a citizen of the United States, residing at Plantsville, in the county of Hartford and State of Connecticut, have made certain new and useful Improvements in Screw-Drivers Having Adjustable Handles, of which the following is a specification.

My invention relates to improvements in screw drivers having adjustable handles, and the objects of my improvements are simplicity and economy in construction and convenience and efficiency in use.

In the accompanying drawing: Figure 1 is a side elevation of my improved screw driver. Fig. 2 is a similar view, turned 90 degrees from that shown in Fig. 1. Fig. 3 is a view of the parts shown in Fig. 1, with the handle adjusted to an angle of 90 degrees relatively to the blade member. Figs. 4 and 5 are side elevations of the rear and front handle members, respectively, in the position shown in Fig. 2. Fig. 6 is a view of the parts shown in Figs. 1 and 3 with the handle members opened out 180 degrees so as to be in alinement and at an angle of 90 degrees to the blade, and the alternative position for one of the handle members in alinement with the blade member indicated by broken lines. Fig. 7 is an edge view of one of the handle members. Fig. 8 is a side elevation of the blade member. Fig. 9 is a similar view of the head of the same turned 90 degrees. Figs. 10, 11, and 12 are views corresponding to Figs. 7, 8, and 9 of modifications of the parts shown in the said figures. Figs. 13, 14, and 15 are views corresponding to Figs. 2, 1, and 3 respectively, of a modification of my screw driver. Fig. 16 is a sectional view of the handle on the line *x x* of Fig. 13, on an enlarged scale. Figs. 17 and 18 are elevational views of the blade member shown in Figs. 13 and 14.

A is the blade member of my improved screw driver, and B is the handle member, and C is a hinge joint uniting the said two members. The said blade member A comprises a blade 20 at one end, a head 21 at the other end provided with a joint member 22, and a shank 23 intermediate the said ends, all generally in alinement. The said handle member B comprises two essentially similar handle parts 24 suitable for being brought into abutment in a radial plane relatively to the said joint C and so shaped as to form when so united a two part handle operative as an ordinary handle and in an ordinary manner. The said handle part 24 comprises a body member 26 having at one end and integral therewith a joint member 25 and has a plane surface 27 on the side adjacent the mating member where the two members meet and are in abutment as shown in Fig. 1, and has enlargements suitable for a bolster 28 and butt 29 and each has a wooden handle scale D, held in place by rivets 30, all of which elements are suitably shaped to combine and operate as an ordinary handle when the said two parts are in abutment. The said joint member 22 on the blade member A comprises a tongue extending upwardly from the said head 21, is pierced by a hole 33, the outer end 34 being semi-circular and concentric with the hole 33, and is faced off on each side to provide a bearing surface 31 and which surface is extended so as to provide a tangential shoulder 32. The said shoulder 32 as shown in Fig. 8 is disposed to the left of the longitudinal plane passing through the axis of the said hole 33, and the corresponding shoulder limiting the bearing surface 31 on the opposite side from that shown in said Fig. 8 is to the right of the said plane. The said joint member 25 of the handle part 24 consists of a tongue that is essentially the counterpart of the said joint member 22 of the blade member A and consists of a generally circular plate-like member having a central hole 35 and a bearing surface 36 and is suitably offset so that the said hole will register with the hole 33, the surface 36 will engage with one of the bearing surfaces 31, and the plane surface 27 may be brought into abutment with the corresponding surface 27 of the mating handle part 24 when similarly engaged with the other bearing surface 31 of the blade member, as shown, an extension of the plane of the said plane surfaces 27 passing through the axis of the said hole 35. The outer wall 37 of the said handle part meets the said circular outline of the tongue 25 tangentially and generally parallel with the said plane surface 27 and thereby forms an engaging wall or stop suitable for engaging with the said shoulder 32 so as to limit the pivotal motion of the said handle part 24 relatively to the said blade member A. A bolt E and nut F, the latter shown as a wing nut, serve to lock the said handle parts 24 and blade member A in any position of adjustment desired within the limits as determined by the said shoulders 32, and which limits permit of essentially 180 degrees of movement of each of the said handle parts. As described the said handle parts 24 may be adjusted so as to form essentially a single ordinary handle as shown in Figs. 1 and 2, or they may both be turned together 90 degrees so as to form a single offset handle as shown in Fig. 3, or the two handle parts may be turned each to the 90 degree limit in opposite directions so as to be 180 degrees apart or in alinement as shown in Fig. 6, or one only may be turned to the 90 degree position, leaving the other in position of alinement with the blade as indicated by broken lines in Fig. 6, or they may be adjusted to positions intermediate to the limiting positions mentioned.

In the modifications shown in Figs. 10, 11, and 12, the bearing faces are provided with locking joints and recesses suitable for coöperation in locking the handle parts 24$^a$ and blade member A$^1$, in predetermined positions, which are preferably, as shown, positions in alinement and 90 degrees thereto, there being provided for this purpose a set of four locking points or projections 38 on the bearing surfaces 31$^a$ spaced at 90 degree intervals, and corresponding recesses 39 on the said bearing surfaces 36$^a$ suitable for engaging therewith.

In the modification shown in Fig. 13, the handle B$^1$ is a solid handle and is joined to the blade member A$^2$ by a half joint C$^1$, the joint members 25$^a$ and 22$^a$ being suitably offset so as to bring the said handle D$^1$ in alinement with the said blade member A$^2$, the said members being suitable for adjustment to the 90 degree position as shown in Fig. 15, or intermediate thereto, in case the engaging surfaces are plane or it may be desirable to provide such surfaces as 31$^b$ and 36$^b$ with locking projections 38 and recesses 39 and limiting the positions of adjustment to the position in alinement and 90 degrees thereto.

My screw driver as described is suitable for the application of a long leverage in turning and using both hands and at the same time permits of effectively guiding the blade in its engagement with the slot of a screw to be turned and is also suitable for permitting access to a screw in cases in which the full length with the handle in alinement with the blade could not be used.

I claim as my invention:

1. A screw driver comprising a blade and a two part handle and each of the said parts individually adjustable to different angular positions relatively to the said blade, the said blade and handle parts having engaging bearing surfaces and held in engagement by a locking bolt, and the said surfaces provided with coöperating locking means comprising projections and recesses held in engagement by the said locking screw.

2. A screw driver comprising a blade and a two part handle, the lower ends of the handle sections pivotally connected to the upper end of the said blade by a common axial body whereby the said handle as a unit and the said handle sections individually may be turned relatively to the said blade, coöperating contacting surfaces on the said handle sections and blade, stop lugs on said blade coöperating with the side of the said handle sections to limit the angular movement of the said handle toward the blade to a 90 degree angular position of adjustment, engaging members on said surfaces comprising projections on one surface and recesses on the other coöperating at said 90 degree position when in engagement to prevent angular movement of the said blade and handle, and the said axial bolt provided with a nut whereby the said surface and engaging members are secured in contacting and engaging position.

3. A screw driver comprising a blade and a two part handle having their ends pivotally connected on a common axis and provided with coöperative locking means, the said handle having the handle body divided symmetrically into the said handle parts along an axial plane, and the said locking means permissive of adjusting the said handle as a unit to positions in alinement with the blade and 90 degrees thereto on each side of the said plane, and permitting alternatively of symmetrical angular separation of the said handle parts by 180 degrees, and of an angular separation of the same of 90 degrees.

4. A screw driver comprising a blade and a two part handle having their ends pivotally connected on a common axis and provided with coöperative locking means, the said handle having the handle body divided symmetrically into the said handle parts along an axial plane, and the said locking means permissive of adjusting the said handle as a unit to positions in alinement with the blade and 90 degrees thereto on each side of the said plane, and permitting alternatively of symmetrical angular separation of the said handle parts by 180 degrees, and of an angular separation of the same of 90 degrees, and the said handle parts provided with handle scales.

WILLIAM S. THOMSON.

Witnesses:
 Geo. R. Bond,
 E. H. Galpin.